Patented June 1, 1926.

1,586,729

UNITED STATES PATENT OFFICE.

ALOIS ZINKE, OF GRAZ, AUSTRIA, ASSIGNOR, BY MESNE ASSIGNMENTS, TO FELICE BENSA, OF GENOVA, ITALY.

PROCESS FOR MANUFACTURING AMINO PERYLENE QUINONES.

No Drawing. Application filed June 15, 1923, Serial No. 645,704, and in Austria April 7, 1923.

It has been discovered that a group of substances hitherto unknown namely the amino perylene quinones is capable of dyeing cotton in very dark colours thus forming as contradistinguished from amino anthraquinones, very useful vat dyes. According to this invention the amino perylene quinones are obtained by the reduction of the corresponding nitro derivatives.

*Examples.*

To a suspension of one part by weight mono- or dinitroperylene quinone in 50 parts by weight of a 5% aqueous caustic soda solution sodium bisulphite is added while the solution is being heated and agitated until the nitro compound is dissolved. In case of dinitroperylene quinone a deep violet solution (vat) is thereby obtained. After ten minutes heating a strong current of air is blown through the hot liquid which causes the liquid to be decolorized and the amino compound is precipitated in the form of a dark powder.

The diamino perylene quinone is insoluble in glacial acetic acid, benzol, alcohol, ether, but soluble in aniline and when heated assumes a violet colour. For purifying it, the compound is crystallized from aniline causing it to be obtained in dark needles having a metallic lustre. In concentrated sulphuric acid it gives a red solution. The vat is blue violet, cotton is dyed violet.

By substituting in the example just described for the dinitro perylene quinone bromo dinitroperylene quinone, bromo diamino perylene quinone is obtained in the form of a dark precipitate which is insoluble in the solvents having a comparatively low boiling temperature, but is soluble in boiling aniline and nitrobenzol. From nitrobenzol it crystallizes in fine dark needles soluble in concentrated sulphuric acid with a cherry red colour. The vat is violet, cotton is dyed violet with a brown tinge

Claim:

As a new article of manufacture amino perylene quinones.

In testimony whereof I have signed my name to this specification.

ALOIS ZINKE.

Patented June 1, 1926.

1,586,729

UNITED STATES PATENT OFFICE.

ALOIS ZINKE, OF GRAZ, AUSTRIA, ASSIGNOR, BY MESNE ASSIGNMENTS, TO FELICE BENSA, OF GENOVA, ITALY.

PROCESS FOR MANUFACTURING AMINO PERYLENE QUINONES.

No Drawing. Application filed June 15, 1923, Serial No. 645,704, and in Austria April 7, 1923.

It has been discovered that a group of substances hitherto unknown namely the amino perylene quinones is capable of dyeing cotton in very dark colours thus forming as contradistinguished from amino anthraquinones, very useful vat dyes. According to this invention the amino perylene quinones are obtained by the reduction of the corresponding nitro derivatives.

*Examples.*

To a suspension of one part by weight mono- or dinitroperylene quinone in 50 parts by weight of a 5% aqueous caustic soda solution sodium bisulphite is added while the solution is being heated and agitated until the nitro compound is dissolved. In case of dinitroperylene quinone a deep violet solution (vat) is thereby obtained. After ten minutes heating a strong current of air is blown through the hot liquid which causes the liquid to be decolorized and the amino compound is precipitated in the form of a dark powder.

The diamino perylene quinone is insoluble in glacial acetic acid, benzol, alcohol, ether, but soluble in aniline and when heated assumes a violet colour. For purifying it, the compound is crystallized from aniline causing it to be obtained in dark needles having a metallic lustre. In concentrated sulphuric acid it gives a red solution. The vat is blue violet, cotton is dyed violet.

By substituting in the example just described for the dinitro perylene quinone bromo dinitroperylene quinone, bromo diamino perylene quinone is obtained in the form of a dark precipitate which is insoluble in the solvents having a comparatively low boiling temperature, but is soluble in boiling aniline and nitrobenzol. From nitrobenzol it crystallizes in fine dark needles soluble in concentrated sulphuric acid with a cherry red colour. The vat is violet, cotton is dyed violet with a brown tinge

Claim:

As a new article of manufacture amino perylene quinones.

In testimony whereof I have signed my name to this specification.

ALOIS ZINKE.

Certificate of Correction.

It is hereby certified that in Letters Patent No. 1,586,729, granted June 1, 1926, upon the application of Alois Zinke, of Graz, Austria, for an improvement in "Processes for Manufacturing Amino Perylene Quinones," an error appears requiring correction as follows: In the heading, line 5, date of filing application in Austria, for "April 7, 1923" read *June 20, 1922;* and that the said Letters Patent should be read with this correction therein that the same may conform to the record of the case in the Patent Office.

Signed and sealed this 12th day of October, A. D. 1926.

[SEAL.]

M. J. MOORE,
*Acting Commissioner of Patents.*

Certificate of Correction.

It is hereby certified that in Letters Patent No. 1,586,729, granted June 1, 1926, upon the application of Alois Zinke, of Graz, Austria, for an improvement in "Processes for Manufacturing Amino Perylene Quinones," an error appears requiring correction as follows: In the heading, line 5, date of filing application in Austria, for "April 7, 1923" read *June 20, 1922;* and that the said Letters Patent should be read with this correction therein that the same may conform to the record of the case in the Patent Office.

Signed and sealed this 12th day of October, A. D. 1926.

[SEAL.]

M. J. MOORE,
*Acting Commissioner of Patents.*